(12) United States Patent
Bachheibl et al.

(10) Patent No.: US 12,512,730 B2
(45) Date of Patent: Dec. 30, 2025

(54) PHASE TERMINAL FOR ELECTRIC MOTORS FOR PHASE CURRENT MEASUREMENT

(71) Applicant: MOLABO GmbH, Ottobrunn (DE)

(72) Inventors: Florian Bachheibl, Ottobrunn (DE); Stefan Rossner, Ottobrunn (DE)

(73) Assignee: MOLABO GmbH, Ottobrunn (DE)

( * ) Notice: Subject to any disclaimer, the term of this patent is extended or adjusted under 35 U.S.C. 154(b) by 266 days.

(21) Appl. No.: 18/286,866

(22) PCT Filed: Apr. 13, 2022

(86) PCT No.: PCT/EP2022/059943
§ 371 (c)(1),
(2) Date: Oct. 13, 2023

(87) PCT Pub. No.: WO2022/219078
PCT Pub. Date: Oct. 20, 2022

(65) Prior Publication Data
US 2024/0195256 A1    Jun. 13, 2024

(30) Foreign Application Priority Data
Apr. 16, 2021   (DE) .................... 10 2021 203 802.6

(51) Int. Cl.
*H02K 11/27*  (2016.01)
*H02K 3/50*   (2006.01)
(Continued)

(52) U.S. Cl.
CPC .............. *H02K 11/27* (2016.01); *H02K 3/50* (2013.01); *H02K 11/33* (2016.01); *G01R 15/207* (2013.01);
(Continued)

(58) Field of Classification Search
CPC .......... H02K 11/27; H02K 3/50; H02K 11/33; H02K 11/30; H02K 2203/06;
(Continued)

(56) References Cited

U.S. PATENT DOCUMENTS 9,455,653 B1 *    9/2016  Garcha ................... H02K 11/33
2016/0327593 A1 * 11/2016 Labbe .................. G01R 15/183
2022/0140705 A1 *  5/2022 Schoeneck ........... H02K 11/215
                                                           310/71

FOREIGN PATENT DOCUMENTS

CN       112600364 A    4/2021
DE       202016106731   8/2017
(Continued)

OTHER PUBLICATIONS

Kessler et al., Method for Diagnosing an Electric Motor, Oct. 21, 2020, EP 3726234 (English Machine Translation) (Year: 2020).*
(Continued)

*Primary Examiner* — Alexander A Singh
(74) *Attorney, Agent, or Firm* — Morgan, Lewis & Bockius LLP

(57) ABSTRACT

An electric drive may include an electric motor phase terminal for phase current measurement. The electric drive may include an inverter, an electric machine having a plurality of phase current branches, the electric machine and the inverter being arranged together in a housing, and the one magnetic field sensor without a magnetic core for measuring a current of at least one of said plurality of phase current branches. At least one phase current branch of the plurality of phase current branches may include a slot bar which is arranged at least partially in a slot of the electric machine and which forms a phase terminal outside the slot, and the phase terminal may have a curvature in the region of which the at least one magnetic field sensor without a magnetic core is arranged.

15 Claims, 5 Drawing Sheets

(51) Int. Cl.
*H02K 11/33* (2016.01)
*G01R 15/20* (2006.01)
*G01R 31/34* (2020.01)

(52) U.S. Cl.
CPC ........ *G01R 31/343* (2013.01); *H02K 2203/06* (2013.01); *H02K 2211/03* (2013.01)

(58) Field of Classification Search
CPC .............. H02K 2211/03; G01R 15/207; G01R 31/343; G01R 31/34; G01R 15/20
USPC ....................................................... 310/68 C
See application file for complete search history.

(56) References Cited

FOREIGN PATENT DOCUMENTS

| | | | |
|---|---|---|---|
| DE | 201910205561 A1 | 10/2020 | |
| EP | 3726234 A1 * | 10/2020 | ........... G01R 31/343 |
| WO | WO2008107773 A1 | 9/2008 | |
| WO | WO2011064095 A2 | 6/2011 | |
| WO | WO2013065849 A1 | 5/2013 | |

OTHER PUBLICATIONS

International Search Report of Application No. PCT/EP2022/059943, dated Sep. 15, 2022, 4 pages.

* cited by examiner

PHASE TERMINAL FOR ELECTRIC MOTORS FOR PHASE CURRENT MEASUREMENT

TECHNICAL FIELD

The present invention relates to the technical field of electric drives which have phase terminals of an electric machine. A current for operating the electric machine is applied to the phase terminals in order to supply the phases of the electric drive with current. More specifically, the invention relates to electric drives which have a highly integrated structure which is characterised by the integration of at least one electric motor as well as at least one converter as part of the electric drives.

STATE OF THE ART

Drive inverters with an alternating current generator are known, wherein the alternating current generator supplies a current to a terminal field which is connected to the phases of an electric motor, a current line, an alternating current sensor on some phases which supply the electric motor, a current sensor on the current line, an input for receiving information which comprises at least one value of a limit current from the source and a required torque policy, and a controller which controls the phase currents of the electric motor on the basis of the torque policy, while the current in the current line is kept at an acceptable value on the basis of the limit current from the source. Accordingly, a maximum current can always be imposed on the current source without the risk of damaging it (WO 2011/064095 A2).

In this case, however, it is necessary to connect the sensor to the current line and to tap off the phase current via it. This requires current-carrying circuit elements for connection, on the one hand, and also suitable structural arrangements of the sensor in comparison with the current line, on the other hand, which complicates the implementation and arrangement of such a sensor in a drive structurally. In addition, expensive measurement technology is required for measurements by means of such a sensor and to achieve precise measurement results, which further increases the costs even independently of the complicated structure. Especially in multiphase systems, as known from WO 2011/064095 A2, a plurality of sensors or measurement devices is necessary in order to measure the currents of the phases. In order that a compact structure can be made possible despite the plurality of necessary measurement devices, the use of small sensors and circuit elements is necessary, but these are particularly expensive with the required measurement accuracy. Furthermore, a measurement via the current line, such as by connected shunt resistors, would lead to voltage drops and thus to losses at these circuit elements, which would disadvantageously reduce the efficiency of the drive and system. Finally, the separate embodiment of the converter as an external unit, which has to be connected to the motor via connection lines, is a further aspect which disadvantageously increases the required installation space and the total weight of the system.

In addition, it is known from WO 2008/107773 A1 to use open loop sensors with magnetic cores, which are arranged around the current conductor, in order to measure the current which is guided by the current conductor. In this case, the sensor is arranged on a printed circuit board and the magnetic core is arranged in the form of a coil around an opening of the printed circuit board. The current conductor, the current of which is measured, runs through the opening of the printed circuit board and thus through the magnetic core or the coil. However, this solution can also be implemented only in a very complicated manner, since the magnetic core or the coil has to be arranged such that the entire conductor which carries the current to be measured is comprised. This makes the structure complicated and complex, as a result of which the construction costs are increased. In addition, the costs of such a circuit board or printed circuit board are significantly higher than those of a circuit board or printed circuit board without openings through which the current conductor to be measured has to be guided. The guiding of the conductor through such a circuit board opening additionally leads to undesired EMC influences. That is to say that the electronic components connected to the circuit board or printed circuit board would be greatly impaired or completely disrupted in their function by the electrical or electromagnetic effects of the conductor guided through the circuit board or printed circuit board, which makes the application of such a measurement principle very difficult or impossible. In addition, the costs of the magnetic core itself are very high, since such magnetic cores have to be produced from expensive highly magnetic iron with very small hystereses in order to achieve meaningful measurement results. Furthermore, due to the necessary magnetic core which encloses the conductor, this variant has a significantly higher space requirement which is not present in space-critical electric drives. The magnetic core additionally disadvantageously leads to an increased weight. Furthermore, the coupling of the magnetic core to the sensor on the printed circuit board with corresponding structural effort is also necessary in this variant.

If, instead, no magnetic core, no coil or any other element which records or detects the magnetic field were used with a magnetic field sensor and if, instead, only a magnetic field sensor without a magnetic core were used, a problem arises in the accuracy of the measurement results, because the distance of the magnetic field sensor from the current conductor, the current of which is intended to be measured, has a very great influence on the measurement result. This is because a magnetic field sensor measures the magnetic field penetrating it, from which the current intensity of the current which the current conductor conducts can be calculated. As a result of movements or vibrations, the distance of a magnetic field sensor without a magnetic core from the current conductor changes and thus also the magnetic flux density which the magnetic field sensor without a magnetic core measures, for which reason, even without a change in the current to be measured, a faulty change in the measured current would be determined. The vibrations or movements thus lead to measurement errors. This problem is inherent in the use of magnetic field sensors without a magnetic core, since in the case of magnetic field sensors with a magnetic core, the latter encloses the entire conductor, for which reason, even in the case of vibrations or movements in total, the same magnetic field nevertheless penetrates the magnetic core. In other words, a magnetic flux density is measured by magnetic field sensors with a magnetic core, not just as in the case of magnetic field sensors without a magnetic core, but rather a defined magnetic flux. The problem of measurement errors described here thus does not arise in the case of magnetic field sensors with a magnetic core or provided with coils, since the measured magnetic flux is always defined in them.

In connection with the use of magnetic field sensors without a magnetic core in an electric drive, the influence of the distance of the sensor from the current conductor to be measured is extremely problematic, because an electric drive, on the one hand, causes vibrations by the movement of the rotor itself and since an electric drive which is used in vehicles, on the other hand, is also exposed to the movements of the vehicle. Such movements and vibrations lead to the magnetic field sensor and the current conductor also being exposed to constant movements and vibrations, which ultimately constantly changes the distance of the magnetic field sensor from the current conductor and thus also the magnetic field penetrating the magnetic field sensor. As a result, measurement inaccuracies caused by the vibrations and/or movements arise, which negatively influence the accuracy of the measured current value deviating from the actual current. In the control of electric drives starting from an incorrect current value, ultimately the electric drive is also incorrectly controlled and operated, which makes the electric drive not usable efficiently in practice. In particular, the torque fidelity of an electric drive would suffer.

Another problem in the use of magnetic field sensors without a magnetic core is that influences of other, external, magnetic fields cannot be separated from the magnetic field to be measured of the current conductor, the current of which is intended to be determined. This is because in the case of magnetic field sensors with a magnetic core, such external magnetic fields are suppressed by the core. Precisely when used in electric drives, however, a multiplicity of current-carrying conductors, such as those of the plurality of phases of the electric drive, are located in close proximity to the current conductor to be measured of one of the phases, as a result of which a multiplicity of interfering magnetic fields are generated. As a result, too, the measured current is negatively influenced and falsified.

A further problem in the use of magnetic field sensors without a magnetic core is that the flux density of the magnetic field which the current generates in the current conductor to be measured and which penetrates the magnetic field sensor is low. This is because such a sensor is located only on one side starting from the current conductor, whereas a magnetic core comprises the entire conductor and wherein the flux density is amplified by a factor, such as a factor of 100, by a magnetic core. Consequently, by omitting the high permeability without a magnetic core, only a significantly lower flux density can occur at the sensor, for which reason the sensitivity and thus the signal-to-noise ratio is disadvantageously low, which further negatively influences the measurement accuracy.

The invention specified in patent claim 1 is based on the problem of minimizing the disadvantages of the use of magnetic field current sensors without a magnetic core in use in electric drives with an integrated electric machine and an integrated converter, which require an accurate current measurement of the phase currents for operation. By means of an integrated converter, a direct current source connected to the highly integrated drive can be used and the electric machine can be supplied with alternating current generated by the integrated converter without the need for further components or parts. This is of great importance in particular in the field of electromobility, since in many electric vehicles the electrical energy is stored in battery stores, which in turn supply no alternating current but direct current. By contrast, many types of electric motors have to be supplied with alternating current for operation in order to bring about the desired alternating field in the electric motors, which leads to the movement of the rotor in the stator of such electric motors. Since very essential factors for dimensioning the efficiency of electric vehicles represent their weight and the power density, the size and the installation space thus required of the drive parts of the electric vehicles, it is an essential aim of the present invention also to reduce the size of the drive parts of electric vehicles and in the process to save weight, while the performance of the system is nevertheless as high as possible. A high efficiency can ultimately only be ensured with precise control of the drive, for which reason a focus of the present invention is also on improving the accuracy of the measurement results of the phase current.

These problems are solved by the features specified in patent claim 1. Thus, the highly integrated electric drive comprises an electric machine in addition to a converter. At least one phase terminal of a slot bar of the electric machine is arranged outside the slot of the corresponding phase. For current measurement, a measurement principle of magnetic field measurement is used in that a magnetic field sensor without a magnetic core is arranged at a curvature in the phase terminal.

The advantages achieved with the invention are that, instead of magnetic field sensors with a magnetic core, magnetic field sensors without a magnetic core or coil can also be used for measuring the phase currents, without losing the measurement accuracy of magnetic field sensors with a magnetic core. Furthermore, the use of magnetic field sensors without a magnetic core firstly simplifies the construction, since, unlike for example shunt resistors or magnetic field sensors with a magnetic core, such sensors do not have any circuit elements which have to be coupled to the current conductor to be measured or which have to be arranged around the current conductor to be measured. As a result, the system efficiency is increased and the simple construction significantly reduces the space requirement and the production costs compared with conventional solutions. Despite the use of magnetic field sensors without a magnetic core, a high measurement accuracy is achieved because the measurement by the sensor is performed at a curvature of the conductor, the current of which is intended to be measured. The curvature leads to the focusing of the magnetic field at the sensor, for which reason the magnetic field which penetrates the magnetic field sensor without a magnetic core is significantly stronger, which advantageously increases the measurement accuracy and the signal-to-noise ratio. The use of a solid slot rod, which is connected to the converter in the form of a likewise solid phase connection, instead of at a wire winding with leading-out winding ends, leads to an improved stiffness and robustness with respect to accelerations which act on the slot rod and in particular the phase connection, so that vibrations or movements have only a small effect on the distance between the magnetic field sensor and the current conductor to be measured, that is to say the phase connection. As a result, negative interference influences on the measurement result of the magnetic field sensor without a magnetic core are reduced.

Advantageous refinements of the invention are specified in the dependent claims.

In one embodiment, an electric drive comprises a converter, an electric machine comprising a plurality of phase current branches, wherein the electric machine and the converter are arranged together in a housing, and at least one magnetic field sensor without a magnetic core for measuring a current of at least one of the plurality of phase current branches, wherein at least one phase current branch of the plurality of phase current branches comprises a slot rod which is arranged at least partially in a slot of the electric machine and which forms a phase terminal outside the slot, and wherein the phase terminal has a curvature in the region of which the at least one magnetic field sensor without a magnetic core is arranged.

In one embodiment, the phase terminal can extend at least partially in a plane in which a normal of the axis of rotation extends. In other words, in a plane normal to the axis of rotation. The axis of rotation is an axis of rotation of a rotor of the electric drive.

In one embodiment, the phase terminal can be curved away from the direction of the normal within the plane normal to the axis of rotation.

In one embodiment, the at least one magnetic field sensor without a magnetic core can be arranged on a circuit board.

In one embodiment, the at least one magnetic field sensor without a magnetic core can have only one physical connection which connects the at least one magnetic field sensor without a magnetic core to the circuit board. In this case, the one physical connection can comprise one or more physical contacts which, however, connect the at least one magnetic field sensor without a magnetic core only to the circuit board and not to further parts or components, such as a magnetic core.

In one embodiment, the at least one magnetic field sensor without a magnetic core can consist of a surface-mounted component which is arranged as an integrated circuit in a separate housing on the circuit board.

In one embodiment, the at least one magnetic field sensor without a magnetic core can consist of a wired component which is arranged as an integrated circuit in a separate housing on the circuit board.

In one embodiment, the phase terminal can extend at least partially parallel to a plane on which the circuit board is arranged.

In one embodiment, the circuit board can be a circuit board for controlling the converter. In another embodiment, the circuit board can be a circuit board for current measurement which has a signal-transmitting connection to a circuit board for controlling the converter. In this embodiment, the sensor is not arranged on the circuit board for controlling the converter and the sensor can be arranged with the circuit board for current measurement at any location of the electric drive.

In one embodiment, the at least one magnetic field sensor without a magnetic core can be a Hall sensor and/or one of a closed-loop sensor or an open-loop sensor and/or one of a magnetoresistive sensor, an anisotropic magnetoresistive effect, AMR, sensor, a giant magnetoresistance, GMR, sensor, a magnetic tunnel resistance, TMR, sensor or a colossal magnetic resistance, CMR, sensor.

In one embodiment, the phase terminal can have a flexible section with a curvature which connects the phase terminal to the part of the slot bar which is arranged at least partially in the slot of the electric machine. The flexible section can be mechanically flexible at least in a direction of an axis of rotation of a rotor of the electric machine in order to be able to compensate mechanical stresses occurring at least in the direction of the axis of rotation.

In one embodiment, the at least one magnetic field sensor without a magnetic core for measuring the current of at least one of the plurality of phase current branches can be arranged at the flexible portion and in the region of the curvature of the flexible portion.

In one embodiment, the flexible portion can extend orthogonally to the direction of the axis of rotation, wherein the curvature of the flexible portion has a U-shape.

In one embodiment, an O-ring can enclose the phase terminal and divide a space located around the phase terminal into two sub-spaces and separate them from each other in a fluid-tight manner.

In one embodiment, at least one of the sub-spaces can be filled with a casting.

In one embodiment, the casting can be thermally conductive and electrically insulating and the casting can be thermally coupled to a bearing shield of the electric drive. Instead of or in addition to the bearing shield, the casting can be thermally coupled to a heat sink of the electric drive.

In one embodiment, the electric drive can additionally comprise an acceleration sensor.

In one embodiment, the converter can have an architecture with at least three planes which extend orthogonally to the axis of rotation and which are arranged offset to each other in the direction of the axis of rotation.

In one embodiment, the converter can comprise a first plane, wherein a circuit board for controlling the converter is arranged on the first plane.

In one embodiment, the at least one magnetic field sensor without a magnetic core can be arranged on the circuit board for controlling the converter in the first plane.

In one embodiment, the converter can have a second plane, wherein at least one semiconductor component of the converter is arranged on the second plane.

In one embodiment, the section of the phase terminal which extends at least partially in a plane in which the normal of the axis of rotation extends can be arranged on the second plane.

In one embodiment, the converter can have a third plane, wherein at least one heat sink for cooling the semiconductor components is arranged on the third plane.

In one embodiment, the third plane can have a DC terminal with a negative pole, wherein the second plane has a DC terminal with a positive pole.

In one embodiment, the converter can have a fourth plane, wherein the fourth plane has a DC terminal which consists of a positive pole and a negative pole, wherein the section of the phase terminal which extends at least partially in a plane in which the normal of the axis of rotation extends is arranged on the fourth plane.

In one embodiment, the converter can have a fourth plane, wherein the section of the phase terminal which extends at least partially in a plane in which the normal of the axis of rotation extends is arranged on the fourth plane, and wherein the third plane has a DC terminal with a negative pole and wherein the second plane has a DC terminal with a positive pole.

The preceding summary serves to summarize some embodiments in order to provide a basic understanding of the aspects of the subject matter described herein. Accordingly, the features described above should not be interpreted as limiting the scope of the subject matter described herein. Furthermore, the above and/or further embodiments can be combined in any suitable combination to provide further embodiments. Further features, aspects and advantages of the subject matter described herein will become apparent from the following detailed description, the drawings and the claims.

DRAWINGS

In order to describe the way in which the embodiments of the invention described above are implemented and to define other advantages and features of the disclosure, a more precise description is provided below. In the accompanying drawings, aspects of the description are illustrated, wherein like numerals denote like elements. With the understanding that these drawings illustrate exemplary embodiments of the invention and are therefore not to be considered as limiting in scope, the embodiments will be explained in more detail below with additional details through the use of the accompanying drawings.

DETAILED DESCRIPTION

Figure 1:
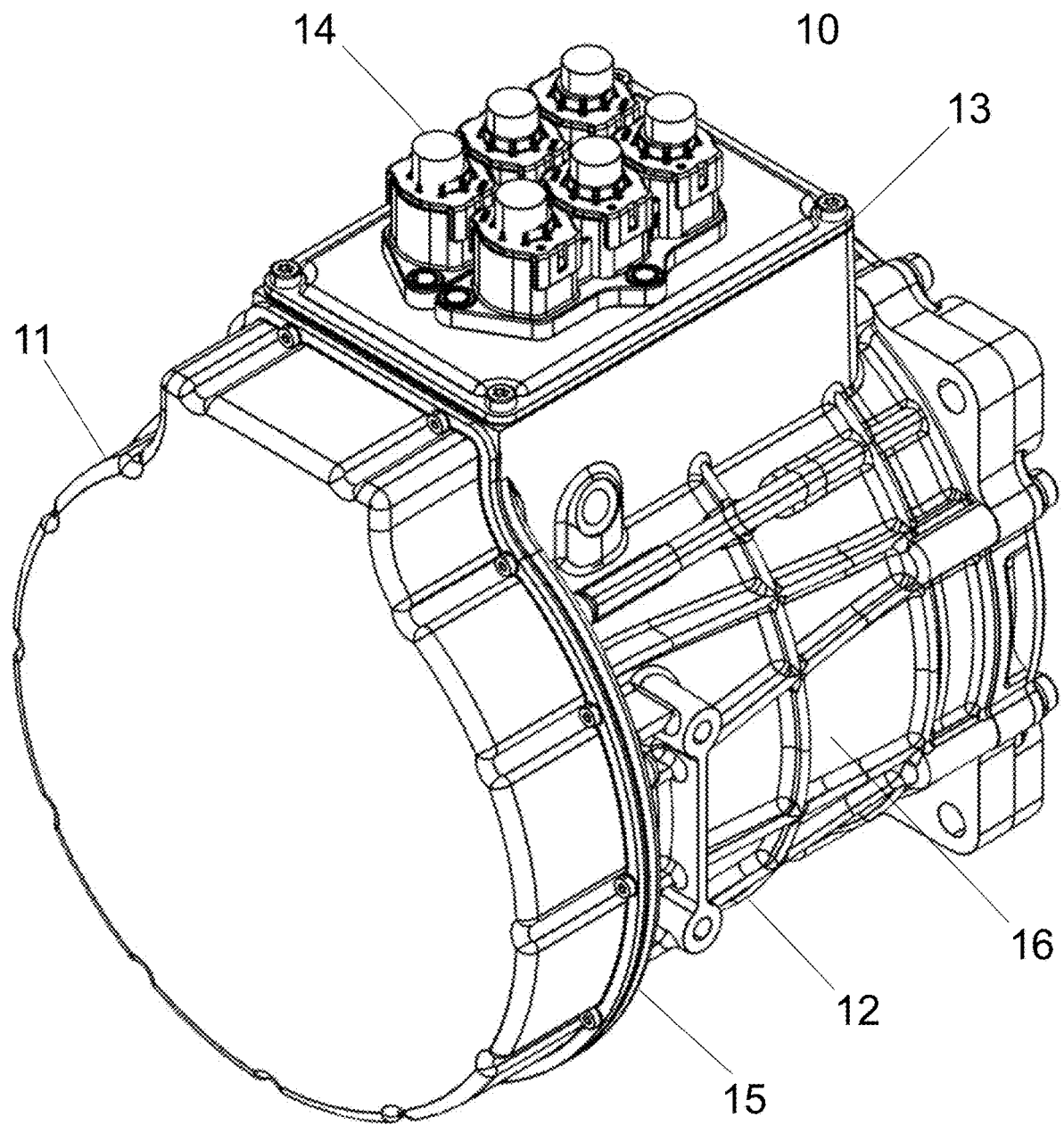
FIG. 1 shows an electric drive in a perspective view.

The explanation of the invention follows on the basis of the drawings according to the structure and mode of operation of the illustrated invention. The present disclosure is to be better understood in view of the following explanations:

An open-loop sensor is generally understood to mean a magnetic field sensor, also referred to as a Hall effect sensor, with a magnetic transducer in order to generate a voltage which is proportional to the measured current. This signal is then amplified in order to generate an analogue output signal which is proportional to the current flowing in the conductor. The conductor is guided through the centre of a ferromagnetic core, also referred to as a magnetic core, in order to concentrate the field, and the magnetic transducer is placed in the gap of the core.

By contrast, a closed-loop sensor is understood to mean a magnetic field sensor which comprises a coil which is actively driven by the current sensor circuit in order to generate a magnetic field which is opposite to the field generated by the current in the conductor. This is because, in an open-loop configuration, any non-linearity or drift in the sensitivity of the magnetic field current sensor IC over the temperature can lead to errors, which can be prevented by the use of the actively driven coil. Closed-loop current sensors with a closed control loop therefore require not only ferromagnetic cores, but also a coil and additional amplifiers of higher power in order to operate the coil. Closed-loop sensors are also larger due to their higher complexity and consume more current since they have to drive the compensation coil, and are more expensive due to the additional coil and the drive circuit. The efficiency of the system is thus also disadvantageously reduced by such sensors.

A magnetic field sensor without a magnetic core should be understood to mean a sensor which does not have a magnetic core or a coil through which a current conductor, the current of which is intended to be determined with the magnetic field sensor without a magnetic core, runs. A magnetic field sensor without a magnetic core can accordingly be arranged on, at, that is to say in the region of, or next to a current conductor, the current of which is intended to be determined with the magnetic field sensor without a magnetic core. In this case, a limit of the free positionability of the magnetic field sensor on, at or next to the current conductor arises in that the magnetic field sensor without a magnetic core has to be arranged in the effective region of the magnetic field which forms around the current-carrying current conductor. In some magnetic field sensors without a magnetic core, the magnetic flux also has to occur perpendicularly to the measurement surface, in other so-called 2D or 3D sensors, however, the vector of the magnetic flux can be measured and in these an arrangement oriented perpendicularly to the magnetic flux is not required. The present invention is not restricted in this respect and the exemplary embodiments comprised in the following description comprise both variants since both a perpendicular arrangement and an arrangement deviating therefrom and both types of magnetic field sensors without a magnetic core can be comprised. If these requirements are met, the magnetic field sensor without a magnetic core can be used for the present invention. A magnetic field sensor without a magnetic core can also be understood to mean a Hall effect-based sensor. The functioning of magnetic field sensors and their subtypes is known to the person skilled in the art, for which reason a description of the precise structure of the sensors themselves is not made in the present case and for which reason all types of magnetic field sensors can be used for the present invention.

An electric vehicle is to be understood to mean any vehicle which has an electric drive and which uses this at least partially, as in hybrid vehicles, or alone, as in vehicles with only one or more electric drives, for driving the vehicle. Thus, boats or ships, motor vehicles such as cars, buses or trucks, as well as aerial devices such as aircraft, drones or helicopters, rail vehicles or other vehicles which fall under these categories, but also small vehicles such as electric scooters, electric bicycles can be understood as electric vehicles. This list is not to be understood as a conclusive description, but merely mentions exemplary forms of vehicles which, if they have an electric drive, are to be understood as electric vehicles.

In the present case, an electric machine is to be understood to mean an electric machine which is used mainly in motor operation as a drive, but which can also be used in generator operation, such as for recuperating energy. An electric machine can alternatively also be referred to as a motor and comprises a rotor and a stator with slots, wherein the slots of the stator are not filled with windings which usually consist of a plurality of turns of a wire winding, such as a copper wire winding, but with bars. These bars are solid metal elements which, unlike conventional wire windings, almost completely fill the slots. Almost complete filling is to be understood to mean that the degree of filling in the slot is for example more than 80%, or between 80 and 90%, or more than 90%. A slot bar corresponds in the technical sense to a winding with a number of turns equal to ½. However, a slot bar is more robust and more stable than a wire winding and a slot bar is produced as a solid metal component, for example by an extrusion method or by another method suitable for this purpose, such as a casting method. The bar can be produced from aluminum or any other conductive metal, such as copper, or also from another electrically conductive material, such as graphite. In order that such a slot bar or a piece of the slot bar which is guided out of the slot and constitutes a phase terminal has a curvature, it is necessary to produce the phase terminal of the slot bar in a targeted manner, for example with a correspondingly curved casting mould, or by means of an automatic bending machine specifically suitable for this purpose. A curvature is thus to be understood as meaning a deformation or formation of the phase terminal in sections, which deviates from the uniform, for example bar-shaped or cylindrical, form of the phase terminal and which cannot be produced merely by conventional winding or other arrangement or merely conventional bending of a wire of a winding after the production of the phase terminal, because the solid and robust phase terminal can no longer readily be bent into any desired form or can be arranged in a correspondingly curved manner after its production. In addition, the curvature can also be embodied in the form of a tapering of the phase terminal.

A circuit board, also referred to as a printed wiring board, printed circuit board or PCB, is to be understood as meaning a carrier for electronic components which serves for the mechanical fastening and electrical connection of these electronic components. Circuit boards consist of an electrically insulating material on which electrically conductive connections, also referred to as conductor tracks, are fitted. A circuit board can also be configured with a plurality of layers.

FIG. 1 shows an electric drive 10 in a perspective view. The electric drive 10 comprises a converter 11 which is arranged as an integrated part in the electric drive 10. It is thus an integrated converter which is arranged in the housing of the electric drive 10. The integrated arrangement of the converter makes it possible for the electric drive 10 to be configured in a particularly compact manner. This is because converters are usually used as separate or external devices, with the result that a further housing, circuit elements and electrical coupling elements would be necessary, which in turn all take up installation space. This leads to a greater space requirement of the drive system and also to a higher system weight. Both are disadvantageous, in particular also in use for electric vehicles of any type.

The electric drive 10 additionally comprises an electric machine 12 which is an electric machine integrated into the electric drive 10. Although an electric machine is mentioned in order to simplify the description, the electric drive 10 according to the present invention can also comprise a plurality of electric machines and is not restricted to an electric machine. An electric machine 12 comprises at least one rotor and one stator. Slots through which phase current branches extend are provided in the stator. The phase current branches serve to generate a magnetic field which changes permanently on account of the alternating current present in the phase current branches. In the case of an asynchronous machine, as a result of the change in the field in the rotor of the electric machine, voltages are induced which cause currents, which brings about the rotation of the rotor and thus the movement of the electric machine. In the case of a synchronous machine, as a result of the change in the field between rotor and stator, a magnetic energy arises which the system attempts to minimise by rotation of the rotor. The functioning of an electric machine 12 is known to the person skilled in the art, however, and will therefore not be described further at this point and the electric machine 12 is restricted neither to an asynchronous machine nor to a synchronous machine, but can be such a machine.

The electric drive 10 additionally comprises a connection box 13 which is arranged on the motor casing 16 of a housing 15 of the electric drive 10. In this case, the motor casing 16 constitutes the housing wall of the housing 15 in the region of the electric machine 12 and the motor casing 16 could also be referred to as machine casing. The connection box 13 serves to connect the electric drive 10 to one or more external energy sources which are not illustrated in the drawings. For this purpose, cables 14 which originate from one or more direct current sources, such as a battery or a battery system of an electric vehicle, are coupled to the connection box 13 and the electric connections present therein. Thus, the electric drive 10 can be supplied with direct current which is then converted into an alternating current by the converter 11 in order ultimately to supply the phase current branches of the electric machine 12 with alternating current. For the supply with current, the electric drive 10 has, within the housing 15, further electrically conductive conductors which are not illustrated in the drawings and which ensure the electrically conductive connection between the components of the electric drive 10.

Figure 2:
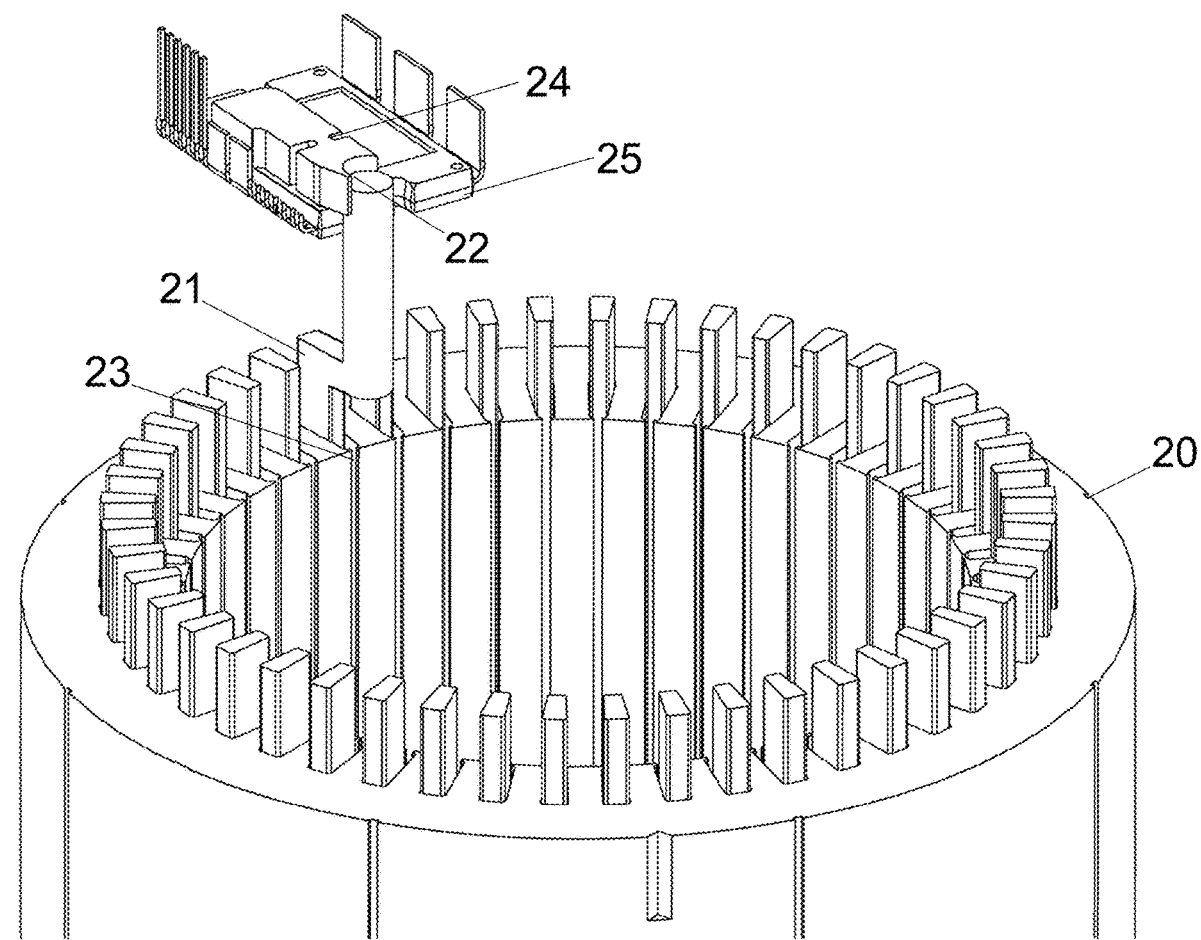
FIG. 2 shows a part of a stator of an electric drive with a phase connection in a perspective view.

FIG. 2 shows a part of a stator 20 of an electric machine 12 of an electric drive 10 with a phase terminal 22 of a phase current branch in a perspective view. The stator 20 with the components illustrated in FIG. 2 can be arranged in the housing 15, as illustrated in FIG. 1. However, it can also be arranged in any other housing of an electric drive. The stator 20 consists of metal and can be produced in the form of a metal sheet laminate, but is not restricted thereto. The stator comprises a slot 23 in which the slot bar 21 is arranged. As illustrated in FIG. 2, however, the stator has a plurality of slot bars and slots. The slot bar 23 forms a part of a phase current branch which is connected by the phase terminal 22 to current-supplying components of a converter 11. In this case, the phase terminal is a part of the slot bar 21 which is guided out of the slot and which extends through various further elements of the electric drive 10, which are not illustrated in FIG. 2. Thus, an electrical coupling of the slot bar 21 to the converter 11 is possible by the phase terminal 22.

The slot bar 21 is embodied as a solid metal component. As a result, it has a high stiffness and robustness. The phase terminal 22 is also embodied as a solid metal component which substantially corresponds in its cross-sectional area to the cross section of the slot bar 21 and which thus has at least the same high stiffness and robustness as the slot bar 21. By means of such a solid design, in addition to an increased longevity of these components, it can additionally be ensured that the phase terminal 22 is at least just as resistant to the effects of accelerations due to vibrations or movements due to the operation of the electric drive 10 as the slot bar 21. This makes it possible for the distance between the phase terminal 22 and a magnetic field sensor which is used for measuring the phase current which the phase terminal 22 leads to change only very slightly or not at all, as a result of which the measurement accuracy can be increased and measurement errors on account of a change in distance between the phase terminal 22 and a magnetic field sensor can be reduced. Although the phase terminal 22 is illustrated in FIG. 2 as arranged offset toward the axis of rotation of the rotor of the electric machine 12, the phase terminal 22 can also be arranged in direct extension to the slot bar 21, that is to say not offset toward the slot bar 21, or else can also be arranged offset toward a different direction starting from the slot bar 21. In this case, the sideways or lateral offset or distance can also be freely selected in order to meet the requirements of the structure of the electric drive 10.

In an embodiment illustrated in FIG. 2, the phase terminal 22 additionally has a portion offset sideways or laterally starting from the axis of rotation of the rotor of the electric drive 10. This portion of the phase terminal 22 extends within a plane in which a normal of the axis of rotation extends. Thus, the phase terminal 22 runs and extends at least partially, specifically in the form of the sideways or laterally offset portion, in a plane in which a normal of an axis of rotation of the rotor of the electric drive 10 also runs. However, the phase terminal can also be arranged and formed deviating therefrom. In addition, the phase terminal 22 can also be formed within this plane curved away from the direction of the normal, for example curved so as to extend radially outward like a paddle wheel. It is only essential that the phase terminal 22 ensures the electrical coupling of the slot bar 21 to the converter 11 and that it has the necessary robustness and stiffness described above in order to minimise influences of vibrations or movements on the position of the phase terminal 22.

In addition, the phase terminal 22 must have a curvature 24. The focusing of the magnetic field which is generated by the phase current which the phase terminal conducts is achieved by a curvature of the phase terminal 22. As a result, a penetration of the magnetic field sensor with a significantly stronger magnetic field can also be achieved with a magnetic field sensor without a magnetic core which is arranged in the region of the curvature 24. This measurement principle is based on the current being forced through the curvature 24 onto a partial circular path. According to the Biot-Savart law for a conductor loop, this leads to an amplification of the magnetic field by the factor $\pi$, that is to say by more than 3 times. In addition to the pure amplification of the signal, however, this also leads to an improvement in the signal-to-noise ratio since only the signal to be measured is amplified by the curvature 24 with respect to the sensor without a magnetic core which is arranged in the region of the curvature 24 and not also the interference signals of other magnetic fields, such as those of adjacent phase terminals. The measurement accuracy can thus be significantly increased by the curvature 24 without the need for the use of a magnetic core, which is associated with cost, space and weight savings.

In one embodiment of the invention, the electric drive 10 in the electric machine 12 comprises twelve phase current branches with which the slot bars of the stator 20 are supplied. Thus, not every individual slot bar necessarily also has its own phase terminal, such as the phase terminal 22 of the slot bar 21 in FIG. 2. Instead of this, a plurality of bars can be coupled to one another and to each other on the stator, as a result of which a phase terminal can serve to supply current to a plurality of slot bars of the stator. Thus, the slot bar number, as illustrated in FIG. 2, could be 48 and these 48 slot bars can be supplied with current by twelve phase terminals, of which only one is illustrated in FIG. 2, such that in each case four slot bars of the stator are interconnected with one another per phase terminal. These interconnected slot bars and the associated phase terminal then form a phase current branch in the sense of the present application. However, the number of slot bars and of phase current branches or phase terminals can deviate from the number specified here, without the present invention being negatively influenced as a result, in order to adapt the electric drive to its respectively provided use and in order to be able to optimize it accordingly.

In FIG. 2, the portion of the phase terminal 22 which is offset sideways/laterally starting from the axis of rotation of the rotor of the electric drive 10 and which extends within a plane in which a normal of the axis of rotation extends is illustrated as being arranged on an assembly 25 consisting of a plurality of semiconductor switches. The semiconductor switches are in turn coupled to the current supply of the electric drive 10 via electrically conductive connections which are illustrated in FIG. 2 on the right-hand side of the assembly 25 as extending in an upwardly curved manner. The connections arranged on the left-hand side of the assembly 25 and illustrated as extending in an upwardly curved manner serve to connect the semiconductor switches to the electronic components of the converter 11 which control the converter 11. The semiconductor switches of the assembly 25 convert the direct current fed in by the current supply into the alternating current with which the phase terminal 22 is supplied. In this case, the current supply, as described above with regard to FIG. 1, is provided by the cables 14 and the connection box 13 of the electric drive 10. In one embodiment of the present invention, the phase terminal 22 is supplied with alternating current by semiconductor switches of the converter 11. In particular, the converter 11 can comprise a circuit board which is not illustrated in FIG. 2 and which carries the electronic components required for controlling the converter 11. The laterally offset embodiment of the phase terminal including the curvature 24 of the phase terminal 22, which is thus arranged laterally offset, is advantageous in a converter architecture embodied in this way because this portion of the phase terminal 22 thus extends at least partially parallel to a plane of further electronic components of the converter 11, such as the circuit board 51, which is explained further with regard to FIG. 5. In particular, the magnetic field sensor without a magnetic core can also be fitted on the circuit board of the converter 11 for phase current measurement. By means of such an arrangement, an arrangement of the sensor can automatically also result, by means of which the magnetic flux occurs substantially perpendicularly to a measurement surface of the sensor. However, it is also possible to deviate from this embodiment if the converter architecture deviates from the arrangement of the circuit board 51 of the converter 11 described here, which is possible depending on the requirements in terms of structural size and power of the electric drive 10. In addition, it is also possible to deviate from this arrangement if the curvature is arranged at a different location of the phase terminal 22. Thus, the at least one magnetic field sensor 50 without a magnetic core can also be arranged on a circuit board for current measurement (not illustrated in the figures) which has a signal-transmitting connection to a circuit board for controlling the converter 11. In this embodiment, the sensor 50 is not arranged on the circuit board 51 for controlling the converter 11 and the sensor 50 can be arranged with the circuit board for current measurement at any location of the electric drive, for example at a flexible portion 32. Such a deviating variant is explained further below with regard to FIG. 3.

Figure 3:
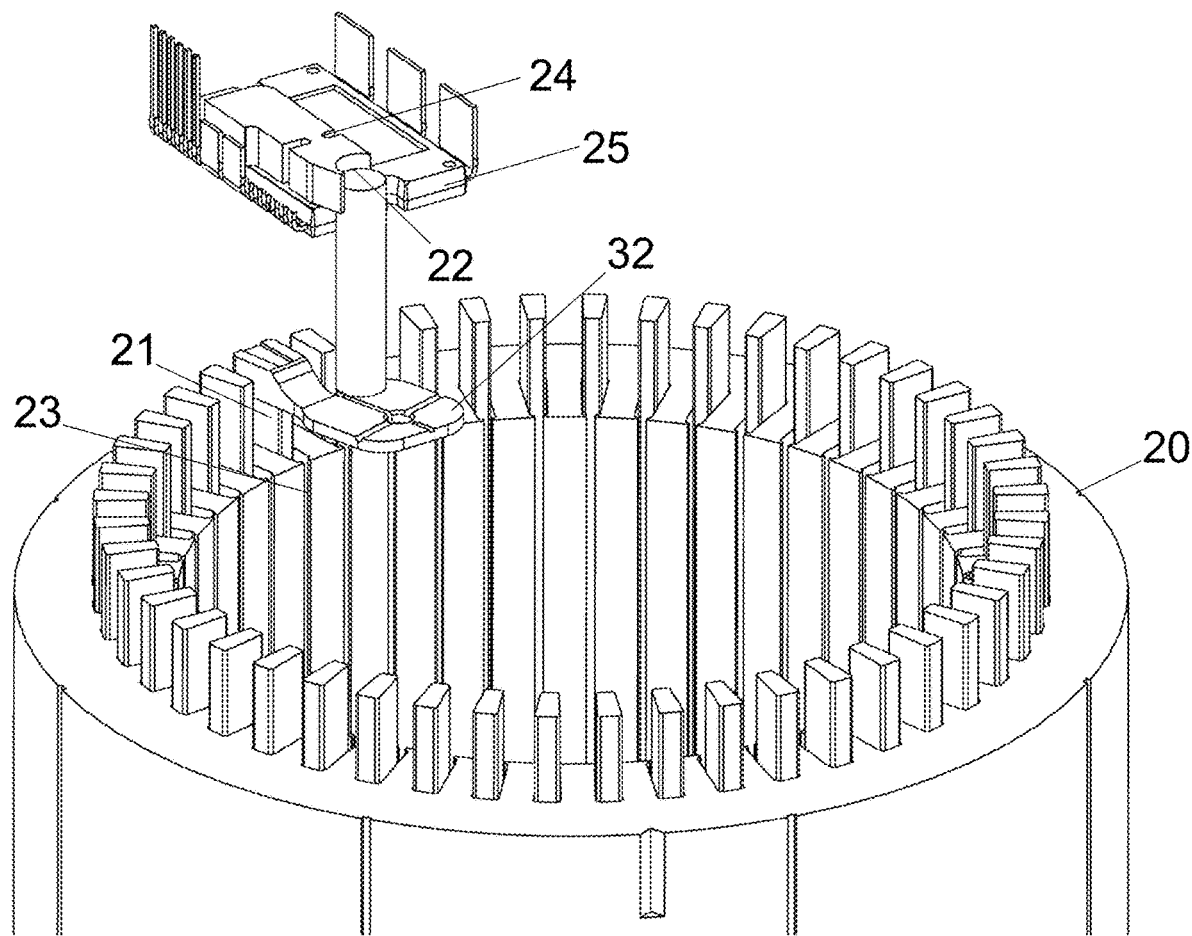
FIG. 3 shows a part of a stator of an electric drive with a phase connection in a perspective view.

FIG. 3 shows a part of a stator 20 of an electric drive 10 with a phase connection 22 in a perspective view. Unlike in the embodiment which is illustrated in FIG. 2 and which is described above, however, the phase terminal 22 according to an embodiment which is illustrated in FIG. 3 has a flexible portion 32 which is itself curved and which thus constitutes a curvature and which connects the phase terminal 22 to a slot bar 21 which is arranged at least partially in a slot of the stator 20 of the electric machine 12. The further elements which are illustrated in FIG. 3 are identical to those in FIG. 2, for which reason these elements will not be described again below. Accordingly, the flexible portion 32 of the phase terminal 22 can optionally be added to the embodiment as described with regard to FIG. 2 or can be removed from the embodiment according to FIG. 3. The flexible portion 32 serves for the additional mechanical decoupling of the phase terminal 22 in order to minimise the influences of vibrations or movements on the position of the phase terminal 22. During operation of the electric machine 12, movements caused by the operation can lead to stronger mechanical stresses, in particular in the direction of the axis of rotation of the rotor. Therefore, the flexible portion 32 can be mechanically flexible at least in the direction along which the axis of rotation of the rotor of the electric machine 12 extends in order to be able to compensate mechanical stresses occurring at least in the direction of the axis of rotation. It can thereby be ensured that a distance between the phase terminal 22 and a magnetic field sensor provided without a magnetic core for measuring the phase current changes only very slightly or not at all, as a result of which measurement errors can be avoided as already described above.

The flexible portion 32 of the phase terminal 22 is designed, as depicted in FIG. 3, such that it forms an extension of the slot bar 21 outside the slot which has a U-shape. In other words, the flexible portion extends in a curved manner, wherein the curved shape overall forms an angle of approximately 180°, wherein the angle can deviate therefrom and is not fixed thereto. Due to this shape, the flexible portion has a higher, spring-like deformability which contributes to the above-described minimization of positional changes of the phase terminal 22 caused by vibrations or movements. The flexible portion 32 can, but does not have to be embodied as an independent part and can be an integral constituent of the phase terminal 22. Furthermore, the curved shape of the flexible portion 32 has the same effect as the curvature 24 of the phase portion 22. The current is forced onto a partial circular path by the curved profile of the conductor portion of the phase terminal 22 which corresponds to the flexible portion 32. According to the Biot-Savart law for a conductor loop, this leads to an amplification of the magnetic field by the factor π, that is to say by more than 3 times. This once again illustrates that the curvature 24 also does not have to represent a tapering, as depicted in FIGS. 2 and 3, but only a shape of the phase terminal 22 which changes the conductor such that the current is at least partially forced onto a circular path-shaped profile. The flexible portion 32 of the phase terminal 22 can thus serve precisely like the curvature 24 as a suitable point for the measurement of the phase current at which a magnetic field sensor without a magnetic core can determine the current with small measurement errors.

Accordingly, the magnetic field sensor without a magnetic core can also be fitted on or in the region of the flexible portion 32, which itself represents a curvature, in all embodiments of the present invention. It would then not be necessary to fit a further sensor on the curvature 24 and the design of the phase terminal with the curvature 24 can then be dispensed with. However, the curvature 24, as depicted in FIG. 3, can also continue to be part of the phase terminal 22 despite the flexible portion 32, such that it is also possible to fit in each case one magnetic field sensor without a magnetic core on or at the flexible portion 32 and the curvature 24, which leads to an increase in the redundancy and reliability. As already described above, the at least one magnetic field sensor 50 without a magnetic core can in this case be arranged on a separate, that is to say on an additional, current measurement circuit board which differs from the circuit board 51 for controlling the converter 11. Such a separate current measurement circuit board can have a signal-transmitting connection via which data which the sensor generates can be transmitted to the circuit board 51 for controlling the converter 11. This connection can be a wireless connection or a wired connection, that is to say a connection to one or more electrical conductors. This embodiment leads to greater flexibility in the design of the electric drive 10, as a result of which the structure can be optimised according to the requirements for saving space in various pieces of the electric drive 10. As a result, in particular in the case of systems with a high number of phase current branches, significant space-savings arise since then not only one sensor but a number of sensors corresponding to the number of phase current branches can be arranged at any other points of the at least one phase terminal 22 with a curvature at which more space is present for the sensors.

Therefore, the present invention requires that the phase terminal has a curvature arranged at any point of the phase terminal, for example in the form of a tapering or in the form of a bend, as a result of which, as explained above, the amplification of the magnetic flux is achieved. Whether this curvature is arranged at a sideways/laterally offset portion of the phase terminal 22, as illustrated in FIG. 2, or at a curved flexible portion 33 of the phase terminal 32, as illustrated in FIG. 3, or, deviating further therefrom, at otherwise another point of a possibly differently configured phase terminal, is not decisive in this case as long as the requirements with regard to the robustness and therefore with regard to the susceptibility to vibration and movement, the space saving and the focusing of the magnetic field of the phase terminal according to the preceding description are met.

Figure 4:
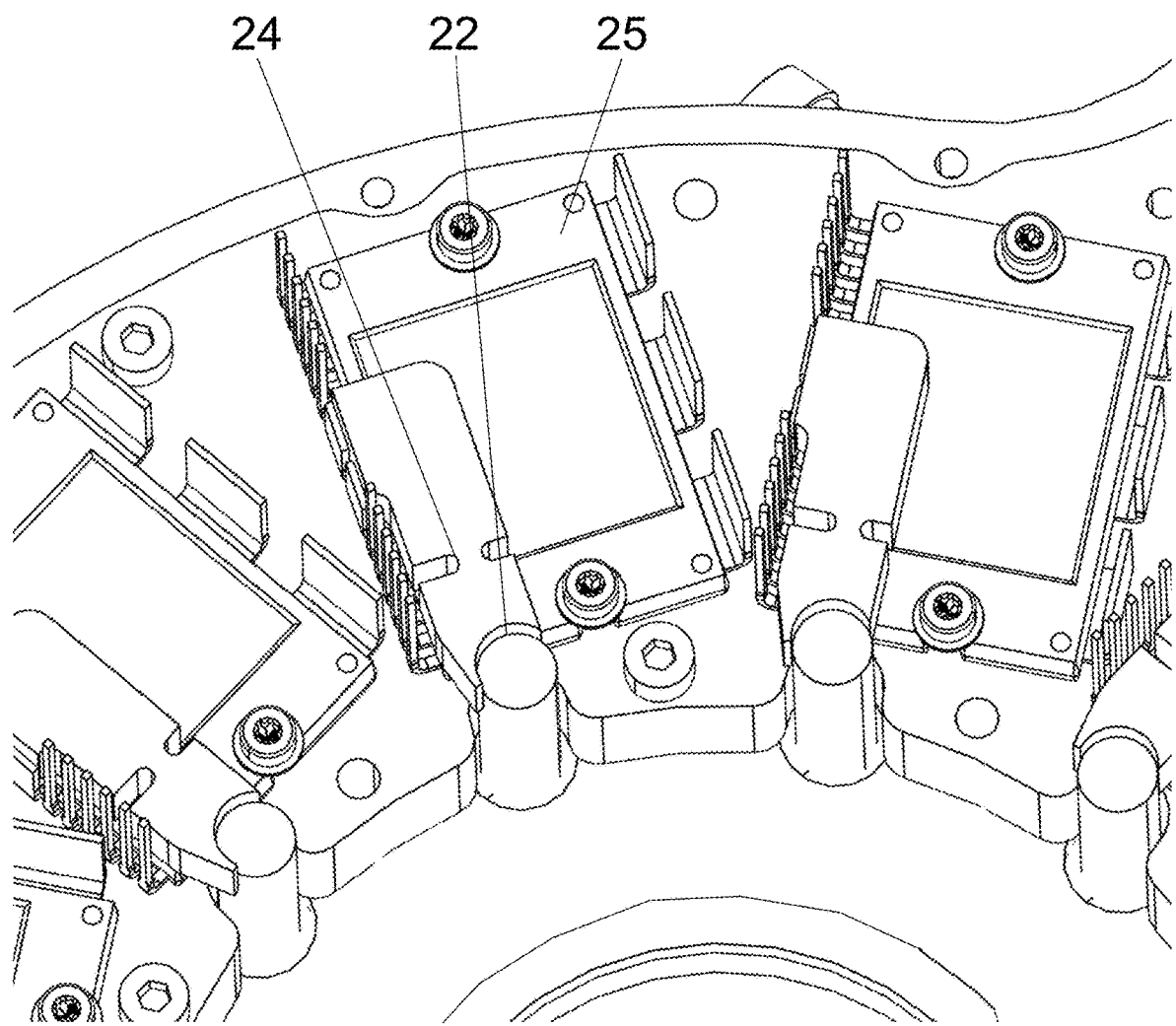
FIG. 4 shows a part of a converter of an electric drive with a phase connection in a perspective view.

FIG. 4 shows a part of a converter 11 of an electric drive 10 with a phase terminal 22 in a perspective view. Further parts of the electric drive 10, which are not depicted in FIG. 2 or FIG. 3, can be seen in FIG. 4. The phase terminal 22 is thus guided through various planes of the converter. Openings through which the phase terminal 22 runs can be provided for this purpose in these planes. The phase terminal can accordingly run through a space of such openings. For the additional mechanical stabilization and in order to further minimise influences of vibrations or movements on the position of the phase terminal 22, an O-ring can enclose the phase terminal 22 such that a space which is located around the phase terminal and through which the phase terminal 22 extends is divided into two sub-spaces since the O-ring bears against the walls of the space. The O-ring thus also serves as an annular sealing element and can separate the two sub-spaces from each other in a fluid-tight manner. As a result, an exchange of gases between the electric machine 12 and the converter 11 is prevented, which is advantageous for the function of the electric drive 10 since this can increase the safety of the electric drive 10. Furthermore, at least one sub-space can be filled with a casting; all sub-spaces can thus also be filled with a casting. The casting can be thermally conductive and electrically insulating and can produce a thermal coupling to a bearing shield of the electric drive. The bearing shield can be a part or a plane of the elements (not illustrated in FIG. 4) of the electric drive 10, through the opening of which the phase terminal 22 extends. A dissipation of heat from the phase terminal 22 into the bearing shield and thus a cooling of the phase terminal 22 can be achieved by the thermal coupling of the phase terminal 22 to the bearing shield. For this purpose, the bearing shield can also be passively or actively cooled, or it can merely serve as a heat buffer. In addition to minimising the influences of vibrations or movements on the position of the phase terminal 22, this can also reduce thermal expansions and slight positional changes of the phase terminal 22 caused by this expansion, as a result of which the measurement accuracy of the magnetic field sensor without a magnet core can be further increased. In addition, the casting brings about a further mechanical fixing of the phase terminal 22 in the openings or the space through which the phase terminal 22 extends.

Alternatively or in addition to the thermal coupling to the bearing shield of an electric drive 10, the casting can additionally produce a thermal coupling to a heat sink of the electric drive. In this embodiment, the thermal coupling by the casting is configured identically to the above-described form of the thermal coupling to a bearing shield, with the result that the preceding aspects can likewise apply to the heat sink, through the opening of which the phase terminal 22 can correspondingly extend. Both in the case of the thermal coupling of the phase terminal 22 by the casting to the bearing shield or to the heat sink, it is not absolutely necessary for the phase terminal 22 to be guided through a tunnel-shaped opening. Instead, it is necessary for the phase terminal to extend at least partially along a surface of the bearing shield or of the heat sink, with the result that a contact surface is present as an interface for heat transfer between these components, with which a certain mechanical fixing is automatically associated.

Although a casting is mentioned above, the casting does not necessarily have to be produced by casting an above-described material. The casting can also be produced by other suitable production methods, by which a thermal coupling, as described above, between the phase terminal 22 and the bearing shield and/or the heat sink can be achieved.

In addition, it can be seen in FIG. 4 that, in addition to a phase terminal 22 and an assembly 25, further such phase terminals and assemblies can be arranged adjacently in order to supply further phase current branches of the electric drive, as described above. Furthermore, the curvature 24 of the phase terminal 22 is depicted from a different perspective. The curved profile of the phase terminal 22 can thus be better seen at the curvature 24, which is provided in this embodiment both on the left-hand side and also on the right-hand side and which can thus be formed as a tapering of the phase terminal 22. Deviating from this embodiment, however, the semiconductor switches of the assembly 25 can also be arranged at a different point of the converter 11. Likewise, as described above, the phase terminal 22 can be formed differently and have a curvature at a different point. In one embodiment, a further plane of the converter 11 is arranged above the plane illustrated in FIG. 4, which further plane comprises a circuit board, as illustrated in FIG. 5.

Figure 5:
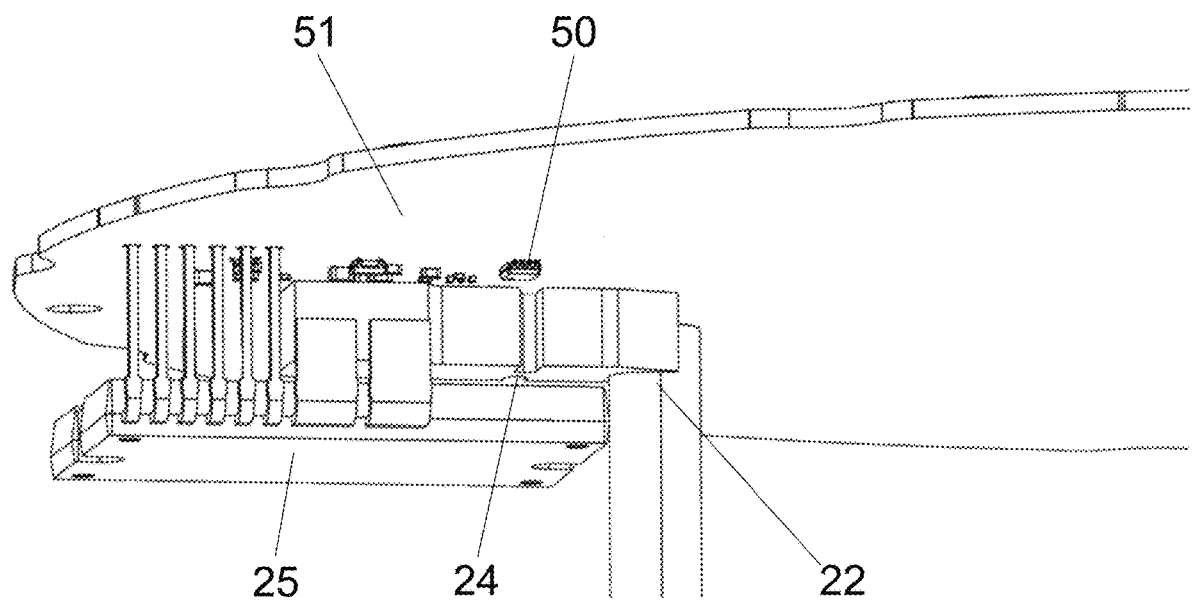
FIG. 5 shows a part of a converter of an electric drive with a phase connection in a perspective view.

FIG. 5 shows a part of a converter 11 of an electric drive 10 with a phase terminal 22 in a perspective view. In one embodiment, the converter 11 can have a circuit board 51, as described above. Electronic components which serve to control the converter 11 can be arranged on this circuit board. In addition, a magnetic field sensor 50 without a magnetic core can be arranged on the circuit board 51. In one embodiment, the sensor can be arranged above the curvature 24 on the circuit board 51. As a result, the sensor is located in the region of the curvature 24, with the result that the latter can measure the magnetic field of the phase terminal 22 which is amplified by the curvature 24. As depicted in FIG. 5, the magnetic field sensor 50 without a magnetic core can be configured as a surface-mounted component, also referred to as SMD or surface mounted device, which is arranged as an integrated circuit in a separate housing on the circuit board 51. Such a surface-mounted component can be fitted fully automatically on the circuit board 51 during production, which leads to time and cost savings during production. However, the magnetic field sensor 50 without a magnetic core can also be configured as a wired electronic component which is arranged as an integrated circuit in a separate housing on the circuit board 51. Such a wired electronic component can be arranged on the circuit board 51 by plug-in mounting, also referred to as push-through mounting or through-hole technology, which is more complex and cost-intensive, however, than in the case of a surface-mounted component.

The use of a magnetic field sensor 50 without a magnetic core on the circuit board 51 simplifies the construction compared with a magnetic field sensor with a magnetic core, since, apart from the simple mounting of the sensor on the circuit board 51, no further wiring and no further connection leading away from the sensor is necessary. Apart from the one physical connection to the circuit board, which is to be understood to mean the mechanical and electrical connection of the sensor to the circuit board by means of one or more physical contacts, such as contact pins or wires, such a sensor consequently comprises no further terminals or connections. In particular, such a sensor comprises no physical connection which couples the sensor to a magnetic core. As a result, losses which would otherwise occur at further terminals, connections or components can be avoided, as a result of which the system efficiency advantageously increases.

Irrespective of whether the magnetic field sensor 50 without a magnetic core is a surface-mounted or wired electronic component, the sensor can constitute a sensor according to one of the following types which are familiar to the person skilled in the art. Thus, it can be a Hall sensor and/or a closed-loop sensor or an open-loop sensor and/or one of a magnetoresistive sensor, an anisotropic magnetoresistive effect, AMR, sensor, a giant magnetoresistance, GMR, sensor, a magnetic tunnel resistance, TMR, sensor or a colossal magnetic resistance, CMR, sensor. This list is not to be understood as limiting, but merely serves to clarify which types of sensors are suitable for use as magnetic field sensor 50 without a magnetic core.

In addition to a magnetic field sensor, the electric drive 10 can also comprise at least one acceleration sensor which can be used for measuring vibrations or movements to which the electric drive 10 is exposed.

In one embodiment, the converter 11 can have an architecture with at least three planes which extend orthogonally to the axis of rotation of the rotor of the electric machine and which are arranged offset to each other in the direction of the axis of rotation. In this case, the converter 11 can comprise a first plane, wherein a circuit board 51 for controlling the converter 11 is arranged on the first plane, as illustrated in FIG. 5. In one embodiment, the at least one magnetic field sensor 50 without a magnetic core can be arranged on this circuit board. In one embodiment, the converter 11 can additionally have a second plane, wherein at least one semiconductor switch of the converter 11 is arranged on the second plane. The assembly 25 can therefore be arranged on the second plane. Thus, the section of the phase terminal 22 which extends at least partially in a plane in which the normal of the axis of rotation extends can also be arranged on the second plane. In one embodiment, the converter 11 can have a third plane, wherein at least one heat sink for cooling the semiconductor switches is arranged on the third plane. In addition, the third plane can have a DC terminal with a negative pole and the second plane can have a DC terminal with a positive pole. The supply of the converter 11 with direct current can take place via these poles.

In addition, the converter 11 can alternatively have a fourth plane, wherein the fourth plane has a DC terminal which consists of both a positive pole and a negative pole, wherein the section of the phase terminal 22 which extends at least partially in a plane in which the normal of the axis of rotation extends is then also arranged on the fourth plane. In addition, the fourth plane can comprise the section of the phase terminal 22 which extends at least partially in a plane in which the normal of the axis of rotation extends arranged on the fourth plane. The third plane can then comprise a DC terminal with a negative pole and the second plane can comprise a DC terminal with a positive pole. As described above, the magnetic field sensor 50 without a magnetic core can be arranged both on the circuit board 51 for controlling the converter 11 and on a circuit board for current measurement which has a data-transmitting connection to the circuit board 51 for controlling the converter 11. The magnetic field sensor 50 without a magnetic core can accordingly be arranged on a previously described plane of the converter 11 which comprises the circuit board 51, or the magnetic field sensor 50 can be arranged outside one of the planes of the converter 11. The electric drive can thus also comprise more circuit boards than only the circuit board 51.

Deviating therefrom, the elements which are described above as being arranged on one of the three or four planes can, however, be arranged on only two or else only one plane. This enables a particularly compact converter architecture. In order to reduce the planes, cutouts in the components and parts used, or multilayer parts, that is to say parts arranged running one above another, can be used. The precise converter architecture is not decisive for the present invention, however, such that the variants described here and illustrated in FIGS. 4 and 5 merely serve for explanation.

Although the above description usually refers to a magnetic field sensor 50 without a magnetic core, more than one magnetic field sensor 50 without a magnetic core can also be used in the electric drive 10. Firstly, because the electric drive 10, as described, can have a plurality of phase current branches and phase terminals. Secondly, because each phase terminal can have a plurality of curvatures, to which in each case a magnetic field sensor 50 without a magnetic core can be fitted.

LIST OF REFERENCE SIGNS

10 Electric drive
11 Inverter
12 Electric machine
13 Connection box
14 cable
15 housing
16 motor casing
20 stator
21 slot bar
22 phase terminal
23 slot
24 curvature
25 assembly
32 flexible portion
50 magnetic field sensor without a magnetic core
51 circuit board

The invention claimed is:

1. An electric drive, comprising:
an inverter;
an electric machine comprising a plurality of phase current branches, wherein the electric machine and the inverter are arranged together in a housing; and
at least one magnetic field sensor-without a magnetic core for measuring a current of at least one of the plurality of phase current branches,
wherein at least one phase current branch of the plurality of phase current branches comprises a slot bar which is arranged at least partially in a slot of the electric machine and which forms a phase terminal outside the slot, and
wherein the phase terminal has a curvature in a region of which the at least one magnetic field sensor without a magnetic core is arranged.

2. The electric drive according to claim 1, wherein the phase terminal extends at least partially in a plane normal to an axis of rotation of a rotor of the electric drive; and/or
wherein the phase terminal is curved away from a direction normal to the axis of rotation within the plane.

3. The electric drive according to claim 1, wherein the at least one magnetic field sensor without a magnetic core is arranged on a circuit board.

4. The electric drive according to claim 3, wherein the at least one magnetic field sensor without a magnetic core has only one physical connection which consists of one or more physical contacts; and
wherein the one physical connection connects the at least one magnetic field sensor without a magnetic core only to the circuit board.

5. The electric drive according to claim 3, wherein
the at least one magnetic field sensor without a magnetic core consists of a surface-mounted component which is arranged as an integrated circuit in a separate housing on the circuit board; or
the at least one magnetic field sensor without a magnetic core consists of a wired component which is arranged as an integrated circuit in a separate housing on the circuit board.

6. The electric drive according to claim 3, wherein the phase terminal extends at least partially parallel to a plane on which the circuit board is arranged.

7. The electric drive according to claim 3, wherein the circuit board is a circuit board for controlling a converter.

8. The electric drive according to claim 3, wherein the circuit board is a circuit board for current measurement which has a signal-transmitting connection to a circuit board for controlling a converter.

9. The electric drive according to claim 1, wherein the at least one magnetic field sensor without a magnetic core is a Hall sensor and/or one of a closed-loop sensor or an open-loop sensor and/or one of a magnetoresistive sensor, an anisotropic magnetoresistive effect, AMR, sensor, a giant magnetoresistance, GMR, sensor, a magnetic tunnel resistance, TMR, sensor or a colossal magnetic resistance, CMR, sensor.

10. The electric drive according to claim 1, wherein the phase terminal further comprises a flexible portion with a curved shape which connects the phase terminal to a part of the slot bar which is arranged at least partially in the slot of the electric machine and which is mechanically flexible at least in a direction of an axis of rotation of a rotor of the electric machine in order to be able to compensate mechanical stresses occurring at least in the direction of the axis of rotation.

11. The electric drive according to claim 10, wherein the at least one magnetic field sensor without a magnetic core for measuring the current of at least one of the plurality of phase current branches is arranged at the flexible portion and in a region of the curved shape of the flexible portion.

12. The electric drive according to claim 10, wherein the flexible portion extends orthogonally to the direction of the axis of rotation and wherein the curved shape of the flexible portion has a U-shape.

13. The electric drive according to claim 1, wherein an O-ring encloses the phase terminal and divides a space located around the phase terminal into two sub-spaces and separates them from each other in a fluid-tight manner.

14. The electric drive according to claim 13, wherein:
at least one of the sub-spaces is filled with a casting; and
the casting is thermally conductive and electrically insulating; and
the casting is thermally coupled to a bearing shield and/or a heat sink of the electric drive.

15. The electric drive according to claim 1, wherein the electric drive additionally comprises an acceleration sensor.

* * * * *